United States Patent

[11] 3,616,039

| [72] | Inventors | John R. Hutzler<br>Greenville, S.C.;<br>David J. Valley, San Diego, Calif. |
|---|---|---|
| [21] | Appl. No. | 781,907 |
| [22] | Filed | Dec. 6, 1968 |
| [45] | Patented | Oct. 26, 1971 |
| [73] | Assignee | Union Carbide Corporation<br>New York, N.Y. |

[54] METHOD OF MAKING A LAMINATED CAPACITOR
12 Claims, 4 Drawing Figs.

[52] U.S. Cl. .................................................... 156/309,
156/250, 317/258
[51] Int. Cl. ................................................... C09j 7/00
[50] Field of Search ......................................... 317/258;
156/309, 250

[56] References Cited
UNITED STATES PATENTS

| 3,054,703 | 9/1962 | Brasure ...................... | 156/309 |
| 3,061,501 | 10/1962 | Dittman et al. ................ | 156/250 |
| 3,107,197 | 10/1963 | Stein et al. ..................... | 156/309 |
| 3,264,536 | 8/1966 | Robinson et al. ............ | 317/258 |
| 3,311,862 | 3/1967 | Rees ............................. | 156/309 |
| 3,342,654 | 9/1967 | Golonka et al. .............. | 317/258 |

FOREIGN PATENTS

| 777,671 | 6/1957 | Great Britain ............... | 156/309 |
| 844,510 | 8/1960 | Great Britain ............... | 156/309 |

Primary Examiner—Reuben Epstein
Attorneys—Paul A. Rose, Harrie M. Humphreys, Frederick J. McCarthy, Jr. and Robert C. Cummings ABSTRACT: A method of making a low value, high quality laminated capacitor which includes inserting at least one sheet of a solid organic dielectric film, having adhesive properties when heated, between electrically conductive metal sheets heating the organic dielectric film to a softening temperature substantially below its melting point, and pressing the organic dielectric sheet and the metal sheets together to bond the dielectric to the metal sheets so as to form a laminate. The laminate is formed without a separate bonding agent.

PATENTED OCT 26 1971 3,616,039

INVENTOR
JOHN R. HUTZLER
DAVID J. VALLEY

BY Leo A. Plumy
ATTORNEY

3,616,039

METHOD OF MAKING A LAMINATED CAPACITOR

BACKGROUND OF THE INVENTION

The present invention relates to dielectric capacitors having improved thermal, electrical, physical, chemical and mechanical characteristics. More particularly, the invention relates to low value, high quality laminate capacitors made by an efficient automated process comprising at least two electrically conductive metal sheets separated by individual sheets of a dielectric film.

Discrete capacitors are manufactured over the capacitance range of 1 picofarad ($10^{12}$F) to 1 farad. As the value of the desired capacitance increases, the dielectric system used generally changes respectively from ceramic and mica to paper to film and metallized film, to tantalum and finally to aluminum. The different materials used are dictated by costs, performance and size factors. Conversely, the more efficient dielectrics used at the high end of the capacitance range are not currently being used at the lower values due to mechanical assembly and handling difficulties. While ceramic capacitors have the desirably feature of relatively low cost, the disadvantages associated with such ceramic capacitors are the capacitance shift with time, temperature and voltage. Monolithic ceramic capacitors enable good size and stability while, on the other hand, the cost of such monolithic ceramic capacitors is much greater than the cost of the ordinary ceramic disc capacitors. Mica capacitors feature a blend of characteristics which fit between the inexpensive ceramic disc capacitors and the relatively higher priced monolithic ceramic capacitors. Mica capacitors exhibit good stability, electrical characteristics and size, and the mica dielectric itself possesses the property desirable for capacitor use of being amenable to cleavage into thin, flat planes which is desirable for capacitory use.

Ceramic capacitors are divided into two broad categories, being known as the disc and the monolithic structures. Disc ceramic capacitors are prepared by firing discs of a suitable ceramic and then applying electrodes to the outer surfaces. Fabrication of the monolithic ceramic capacitor is much more complex. The multilayered monolithic capacitor is made from a ceramic paste consisting of a ceramic powder contained within an organic binder which is cast in a thin layer and then cured. Electrodes are applied by a screen printing process onto the cured dielectric which is stacked, pressed and then fired. Contact is made to the electrodes where they emerge from the ceramic. Finally, leads are attached by soldering and the capacitor is encapsulated. A large number of capacitors can be printed at one time on one substrate and then cut into desired parts before firing.

In a conventional method of fabricating mica capacitors, several layers of mica are stacked between layers of metal foil electrodes. Alternate foils are extended on opposite sides of the stack. The stack is held together with a clamp, and encapsulation is accomplished by molding. The pressure of clamping and molding affect the capacitance of the capacitor and the temperature coefficient of capacitance which is complex and nonlinear with temperature. The stability of such molded, foil mica capacitors is only fair.

In another conventional method of fabricating mica capacitors, the electrodes are made by silk screening a silver paste onto either one or both sides of the mica structure. The silvered mica layers are then stacked together and a tin lead foil is interleaved to provide contact to the electrode area. A mechanical clamp makes electrical contact with the foil while securing the stack in a unit. Lead wires are then attached to the clamp and the capacitor is encapsulated in a phenolic resin. The silvering of the electrodes eliminates voids between the electrode and the dielectric which improves the capacitance stability and the temperature coefficient of capacitance, and also reduces size. Furthermore, capacitance tolerance can be adjusted by removing small areas of the silvered electrode. These mica capacitors, however, may be subject to possible silver migration under high humidity conditions.

In still another conventional method of making laminate capacitors, a dielectric material, such as mylar or polyolefin, is bonded to a metal sheet of electrode material by employing a special bonding agent. Also, paper dielectrics have been impregnated with an epoxy resin which reacts at high temperatures of about 90° to 125° C.

Recently, a polysulfone material has been developed for use as a capacitor dielectric, and is described by Robinson, et al, in U.S. Pat. No. 3,264,536. Polysulfone is a high performance thermoplastic resin having excellent electrical, physical, chemical, mechanical and thermal characteristics. More particularly, polysulfone provides constant dielectric characteristics, high resistivity, low dissipation factor, and a high insulation resistance. In addition, polysulfone possesses good structural integrity and high tensile strength making it available as a continuous roll of film compared with mica or ceramics, thus making it compatible to continuous processing an automated techniques.

OBJECTS

It is an object of this invention to provide a method of making low value laminate capacitors without employing a separate bonding agent between the dielectric material and the metal electrode. It is another object of this invention to provide an automated method of efficiently using a classically midcapacitance range film dielectric system in the low capacitance range and thus achieve both coast and performance advantages in this range of capacitors over those heretofore available. It is still another object of this invention to provide a simply method of making low value capacitors without the many separate noncontinuous assembly operations associated with the manufacture of mica and ceramic capacitors.

SUMMARY OF INVENTION

These and other objects, which will become apparent from the detailed disclosure and the claims to follow, are achieved by the present invention which provides a method of making a laminate capacitor, comprising inserting at least one sheet of a solid organic dielectric film, having adhesive properties when heated, between electrically conductive metal sheets, heating said organic dielectric film to a softening temperature substantially below its melting point, and pressing said organic dielectric sheet and said metal sheets together to bond said dielectric to said metal sheets thereby forming a laminate, whereby said laminate is formed without a separate bonding agent.

The present invention also provides a laminate capacitor comprising at least one sheet of a solid organic dielectric film having adhesive properties when heated, and at least two electrically conductive metal sheets, said metal sheets being separated by and bonded together by said organic dielectric film therebetween.

It is to be understood that as used herein, the term "laminate capacitor" is intended to mean a capacitor having substantially inseparable sheets of metal and dielectric materials. It is also to be understood that as used herein, the term "adhesive" dielectric is intended to mean that the dielectric will adhere to an adjacent metal surface when heated to a softening temperature substantially below the melting point of the dielectric material. It is to be further understood that as used herein, the term "softening temperature" is intended to mean that temperature at which the dielectric becomes viscous but yet does not lose its structural integrity. Plastic flow under pressure occurs at the "softening temperature" so that the dielectric will come into intimate contact with the electrode. While such intimate contact is necessary, the flow must not be so excessive that pinholes or extreme thinning of the dielectric sheet occurs. At or near this softening temperature certain organic dielectrics, such as polysulfone, polyester, polycarbonate and others, will when pressed adhere to metal surfaces in addition to being self-adherent.

THE DRAWINGS

Figure 1:
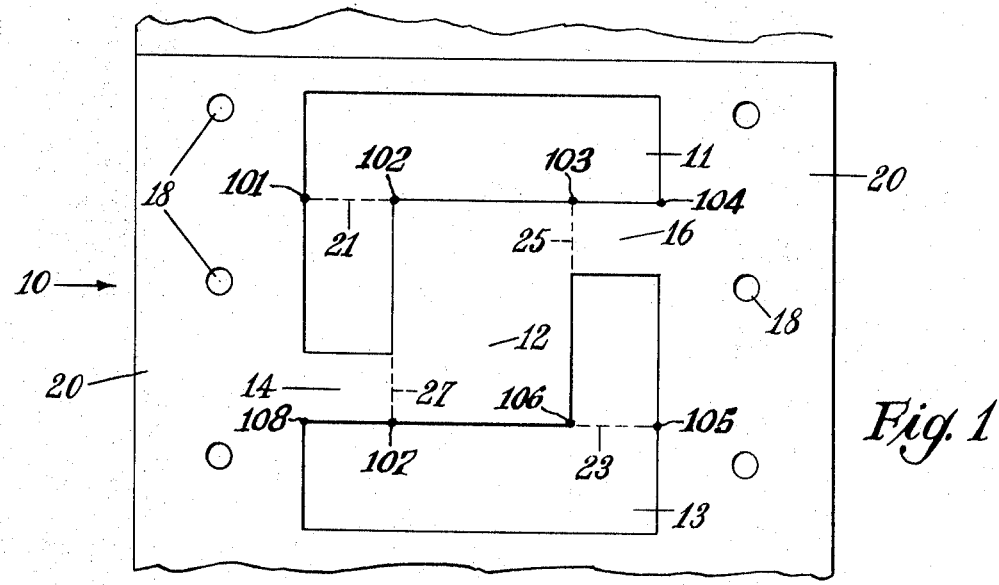
FIG. 1 shows a plan view of a unit section of a metal electrode sheet, illustrative of the invention.

Referring to FIG. 1, there is shown the design of an electrode sheet 10 illustrative of the invention. Electrode sheet 10 has L-shaped cutout portions 11 and 13. The large metal area 12 in the center of electrode sheet 10 is the active area of capacitance. Two small tab portions 14 and 16 provide lead attachments for the capacitor. Sprocket holes 18 located along the side borders 20 of electrode sheet 10 provide for close alignment of multiple sheets of electrodes. The electrode sheet 10 may be a foil made of any suitable electrically conductive metal, such as aluminum or stainless steel, having a thickness of about 0.001 inch. The electrode configuration may be formed by a die punching operation whereby a single tool cuts several layers of metal foil at one time at a rapid rate. The punched electrode, such as electrode sheet 10, is then rewound and stored in rolls.

It is to be pointed out that other variations and modifications in the shape of the cutouts 11 and 13 in the metal electrode sheets 10 may be used. As an example, either of the metal tabs, such as 14 or 16, may instead extend from alternate sides in alternate layers the entire length of the active electrode areas 12 to one of the sections indicated by the dotted lines 21 or 23, respectively, and terminate at line 25 or 27, respectively, on the other side. In such cases, the electrode areas would present a rectangular configuration bounded in one layer by the lines 101–103, 103–106, 106–108 and 108–101, and in adjacent layers by the lines 102–104, 104–105, 105–107 and 107–102. The actual electrode plates of the capacitor would be the overlapping portions of the tow areas in each layer as delineated in the preceding sentence, namely the overlapping areas defined by the lines 102–103, 103–106, 106–107, and 107–102. The metal tabs extending from these central areas would be now enlarged from the smaller tab 14 to comprise the area bounded by lines 101–102, 102–107, 107–108 and 108–101; and in the case of the tab 16, to comprise the area bounded by lines 103–104, 104–105, 105–106, and 106–103.

Figure 2:
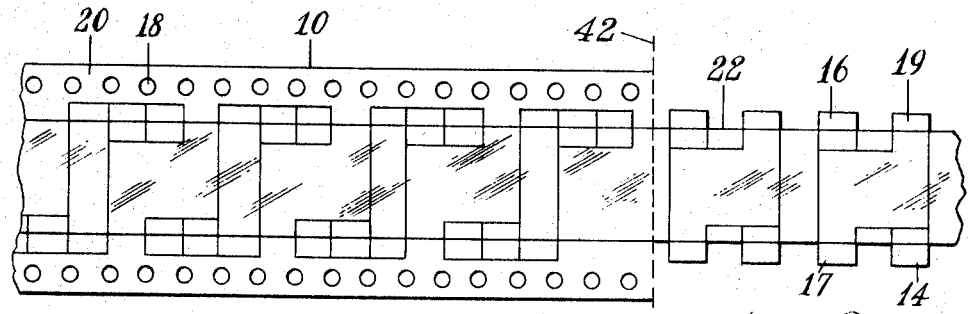
FIG. 2 shows a fragmentary plan view of both the organic dielectric sheets and the metal electrode sheets as they appear before and after the borders of the metal sheets are cut away.

The low capacitance organic film dielectric capacitors are processed continuously on a capacitor forming machine by hot rolling or pressing together the sheets of aluminum foil or stainless steel, such as shown in FIGS. 1 and 2, with one or more sheets 22 of an organic dielectric material, such as polysulfone, polyester or polycarbonate, in a manner whereby the sheets 22 are sandwiched between the electrode sheets 10. Organic dielectric sheet 22 has a width somewhat greater than the width of the active electrode area 12. Dielectric sheet 22 has a thickness of less than 0.010 inch, usually between about 0.0002 to 0.002 inch. Also, the two tabs 14 and 16 associated with one electrode are offset from the tabs 17 and 19 associated with the adjacent electrode sheet. It is to be noted that it is within the scope of this invention to have contact tabs both located only on one side of the electrode instead of one tab on each of the two sides as shown in FIGS. 1 and 2. In such case, the tabs from adjacent layers must be displaced one from the other or that one side.

Figure 3:
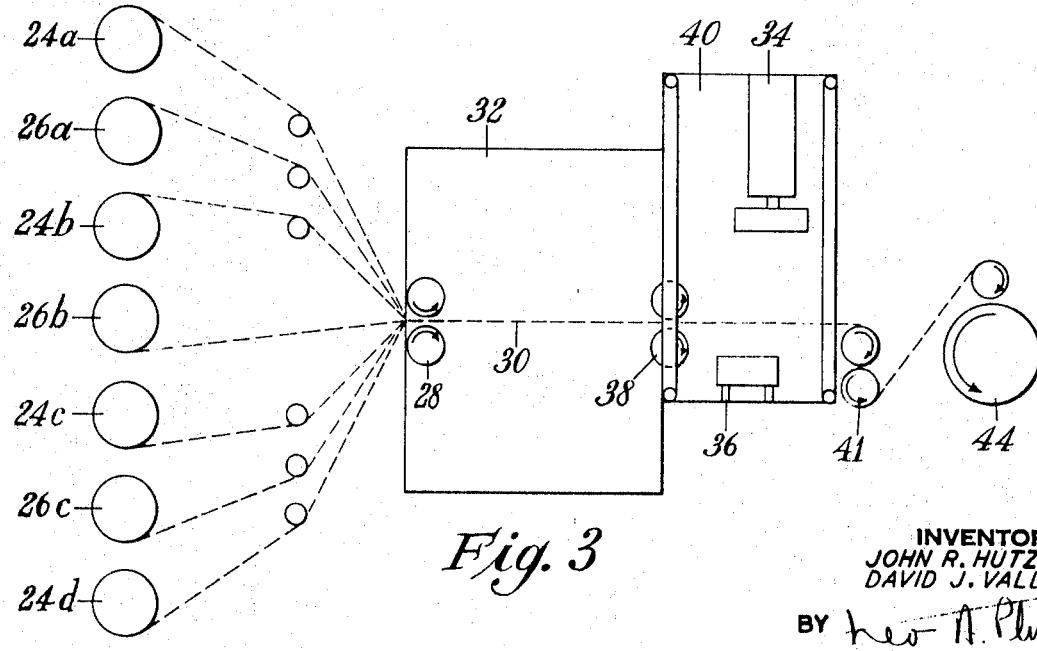
FIG. 3 shows a schematic representation of one type of apparatus suitable for carrying out the laminating process of the invention.

FIG. 3 shows a schematic representation of an apparatus suitable for carrying out the laminating process of this invention. Supply spools 24a–d each feed continuous sheets of organic dielectric film. Sheets of metal foil electrode are fed from supply spools 26a–c. The organic dielectric sheets are alternated between sheets of metal foil, with both the top and bottom spools 24 a and 24 d providing the organic dielectric. In another embodiment, not shown, the spools are arranged with the metal sheets on top and bottom spools. Alternate layers of the metal foil electrode are inverted so that the tabs of adjacent metal electrodes are offset from one another to prevent shorting of the capacitor. The sheets of organic dielectric and metal foil are fed from the spools through idler rolls 28 to form a web 30 of such sheets. A preheat chamber 32 is used to bring the web 30 up to the 24a 24d lamination temperature. Such preheating obviously reduces the time later required for heating in the laminating step, and also removes any residual moisture in the organic dielectric material which might, otherwise, boil at a high temperature thereby rupturing the lamination. The alternate layers of metal electrode and organic dielectric in the web 30 are bonded together by the heat supplied from heated plates 36 and the mechanical pressure provided by a pressure mechanism 34, such as a hydraulic cylinder. After heating in preheat chamber 32, web 30 is advanced through idler rolls 38 and into a laminating section 40 where the web 30 is subjected to heat and pressure. A pressure of about 500 p.s.i. and a temperature in the range of about 200° to 275° C. may be used to form the web 30 into a laminate. Temperatures of between 225° to 250° C. are preferred for the softening of polysulfone. However, the softening temperature of different organic dielectric materials can vary considerably. The temperature must be well below the melting point of the organic dielectric material used, but at a softening temperature at which plastic flow does occur, eliminating voids, causing uniform contiguous compliance between the organic film and the metal foil and resulting in a 10 to 15 percent reduction in thickness of the dielectric material. Furthermore, a chemical reaction, such as polymerization, is not required to cause the adhesion to the foil.

Polysulfone, in addition to its desirable dielectric characteristics has the additional advantage for use in laminate capacitors of adhesion, that is, it readily adheres to itself and to metals, such as aluminum and stainless steel, when heated to temperatures well below its melting point. Similarly, it has been found that other organic dielectric materials, such as polyethylene terephthalate polyester, and polycarbonate, also have the property of adhesion when heated to temperatures well below their melting points. Consequently, these adhesive organic dielectric materials, when employed according to the process of this invention, eliminate the prior art requirements of separate bonding agents or clamps, thereby shortening the processing time and simplifying the assembly operations.

Several laminated capacitors were made according to the method of the present invention, using a different organic dielectric material in each capacitor. The capacitors were subjected to temperature cycling in the temperature ranges of from −65° C. to +125° C. so as to determine the quality of integrity of the lamination. The capacitors underwent 20 of such temperature cycles so as to observe the stability of capacitance which is characteristic of the quality of lamination of the capacitor. Table I lists the organic dielectric materials and the quality of lamination of each material tested.

TABLE I

| Dielectric Material | Quality of Lamination |
| --- | --- |
| Polysulfone | Good |
| Polycarbonate | Good |
| Polyester | Good |

The test results shown in table I indicate that polysulfone, polycarbonate, and polyester materials form good laminates.

It is to be pointed out that while some dielectric materials, such as polyethylene and polypropylene, because of their relatively low melting temperatures could not be evaluated in this test, such dielectrics might prove to be satisfactory laminates if subjected to temperature extremes less than the −65° C. to +125° C. employed.

Next, the three materials, polysulfone, polycarbonate and polyester, were subjected to temperature cycling to determine the quality of the bond. Since the electrodes and the dielectric have different coefficients of expansion, a poor laminate will separate during the temperature cycling, thereby causing a sharp drop in capacitance value. The capacitor specimens were subjected to 20 temperature cycles with temperature extremes of −65° C. and +125° C. Table II shows the test results.

TABLE II

| Dielectric Material | Capacitance Change-Percent (After Temperature Cycle) |
| --- | --- |
| Polysulfone | −0.23% |
| Polycarbonate | −0.33% |
| Polyester | −0.38% |

The data listed in table II indicate that good quality of the laminate bond is provided by heating and pressing the polysulfone, polycarbonate and polyester materials according to the method of the present invention. The change in capacitance is less than 0.5 percent for these three materials.

Therefore, the test results indicate that polysulfone, polycarbonate and polyester film dielectric materials form satisfactory laminated capacitors under the experimental conditions used. Also, capacitors made with polysulfone film exhibit better characteristics than polycarbonate or polyester film with regard to the quality of the laminate, as indicated by the capacitance change due to temperature cycling.

A substantial length of the web 30 may be laminated in one operation of the pressure mechanism 34. After the heat sealed laminated web 30 leaves the section 40 and passes through pull rolls 41, the metal borders 20, shown in FIGS. 1 and 2, are cut away and movement is now provided by the continuous web of laminated material. The dotted line 42, in FIG. 2, illustrates the cutoff point where the metal borders 20 are cut away from the laminated web. The web 30 can be rewound on a takeup roll 44 from which said web 30 is to be cut crosswise to form individual capacitor units.

Since multiple layers of electrodes are required to achieve a desired capacitance, such electrode layers must be electrically interconnected. Of course, the number of organic dielectric sheets as well as the number of electrode sheets may be varied to meet the particular design requirements.

Figure 4:
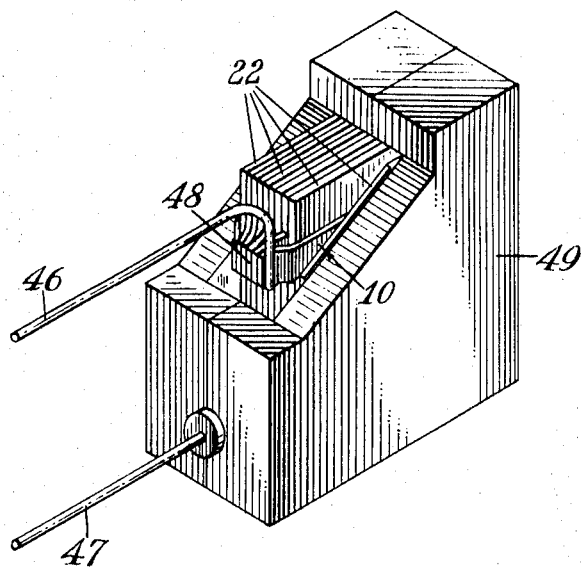
FIG. 4 is a perspective view of the laminated capacitor encapsulated in a protective insulative case, with portions shown broken away to illustrate the electrical connection of the electrode sheets to lead wires.

As shown in FIG. 4, alternate electrode sheets 10 are electrically interconnected by lead wires 46 and 47 by welding or soldering said wires 46 and 47 to lead attach lands or tabs 48 provided on the electrode sheets 10 and protruding outwards away from the sides thereof. Instead of the wires shown, terminal mounting pads may be attached to tabs 48 to accommodate a chip configuration. In regard to the individual dielectric sheets 22, it is to be pointed out that such dielectric sheets 22 are sealed together along their side edges.

As shown in FIG. 4, the laminate capacitor can, if desired, be encapsulated to provide protection against moisture, dirt, temperature, extreme shock, vibrations, etc. In such case, the capacitor may be encapsulated in a case 49 of an insulating material, such as polysulfone.

While the apparatus shown in FIG. 3 has been shown employing individual alternate rolls of both the organic dielectric material and the metal electrode materials, it is to be understood that other variation of apparatus and assembly techniques are within the scope of this invention. For instance, rolls containing only a continuous web of an organic dielectric material may be used. In this case, a web is made up of a plurality of layers of organic plastic film with a space provided between each layer. Metal electrode sheets are fed into these spaces between layers with alternate electrode sheets fed from opposite sides of the web. The metal electrode sheets are not fed through the entire width of the web but are offset from the edge of the organic dielectric film at one side and extend beyond the edge of the web at the other side. All of the metal sheets are cut from the supply roll before the entire stack is laminated together. The laminated web is then moved from work station to work station by means of the continuous plastic film.

What is claimed is:

1. Method of making a laminated capacitor comprising providing at least two electrically conductive metal sheets, providing at least one sheet of a solid organic dielectric film having adhesive properties when heated, arranging one solid organic dielectric film between each two electrically conductive metal sheets in a stacked arrangement, preheating said stacked sheets to remove residual moisture from the organic dielectric and then heating said organic dielectric film to a softening temperature substantially below its melting point and at which it becomes adhesive, and pressing said stacked sheets together to bond said dielectric to said metal sheets thereby forming a laminate free of separate bonding agent.

2. Method as claimed in claim 1, wherein said organic dielectric is taken from any one of the dielectric material polysulfone, polycarbonate, and polyester.

3. Method as recited in claim 2, wherein said laminate is heated to temperatures in the range of about 200° to 275° C., where the organic dielectric material becomes viscous but does not flow substantially as to lose its structural integrity.

4. Method as recited in claim 2, wherein said laminate is pressed together with a pressure of about 500 p.s.i.

5. Method as recited in claim 1, wherein said organic dielectric film has a thickness of less than 0.010 inch.

6. Method as recited in claim 1, wherein said organic dielectric film has a thickness of about 0.0002 to 0.002 inch.

7. Method as claimed in claim 1 wherein at least one metal connecting tab projects from each sheet, the tabs from alternating metal sheets projecting from locations separated from the tab locations on intervening metal sheets whereby electrical connections to the plates of said capacitor can be made through the two sets of separated metal tabs.

8. Method as claimed in claim 7 wherein additional sheets of the same organic film used as the dielectric are arranged over and under the stacked dielectric and metal sheets, said additional sheets covering the metal sheets but not the projecting connecting tabs, and wherein said stacked sheets with covering outer organic films are preheated, heated to a softening temperature and pressed together to form a laminate sealed in the organic film material.

9. Method of making laminated capacitors comprising:
a. providing at least two elongated strips of metal foil, each foil strip having a repeated pattern of cut out portions defining in the remaining foil material a structure comprising two narrow border regions running continuously the length of the foil strip, and a series of spaced-apart central foils areas each having a configuration corresponding to that of an electrode plate of an intended capacitor, each central foil area separated from adjacent central foil areas by the cutout portions and separated from the narrow border regions by cutout portions except for at least one uncut bridging foil portion extending laterally from each central area to an adjacent border region;
b. providing at least one elongated strip of a solid organic dielectric film having adhesive properties when heated, said dielectric strip having a width sufficient, when laid coaxially along a foil strip, to cover the central electrode plate areas but only a portion of each of the bridging foil portions extending laterally therefrom;
c. guiding said foil and dielectric strips coaxially into a layered arrangement with each dielectric strip between two foil strips and with the central areas of each foil strip in registry with the central foil areas of the other foil strip but with the laterally extending bridging portions on one foil strip out of registry with the bridging portions on the other foil strip, d. heating and pressing said layered dielectric and foil strips to form an adhering monolithic elongated laminate;

e. making longitudinal cuts along each border region of said laminated strip to separate said border regions from the elongated strip of solid organic dielectric film supporting the spaced-apart central foil electrode areas laminated thereto with at least one bridging portion extending laterally from each central foil electrode area;

f. cutting the organic strip laterally at points between adjacent central foil electrode areas to produce a plurality of individual laminated capacitory units, each having opposite electrode plates separated by solid organic dielectric films and each capacitor unit having separated positive and negative electrode terminal tabs formed of the bridging foil portions extending laterally from each central foil electrode area.

10. Method as claimed in claim 9 wherein the pattern of cutouts in each foil strip defines uncut bridging foil portions extending from only one side of each central foil area to the border region adjacent that side.

11. Method as claimed in claim 9 wherein the pattern of cutouts in each foil strip defines an uncut bridging foil portion extending from each side of each central foil area to the border region adjacent that side of the central foil area.

12. Method as claimed in claim 10 wherein the pattern of cutouts in each foil strip defines two spaced-apart bridging foil portions extending from each side of each central foil area to the border region adjacent that side of the central foil area.